Patented Mar. 21, 1950

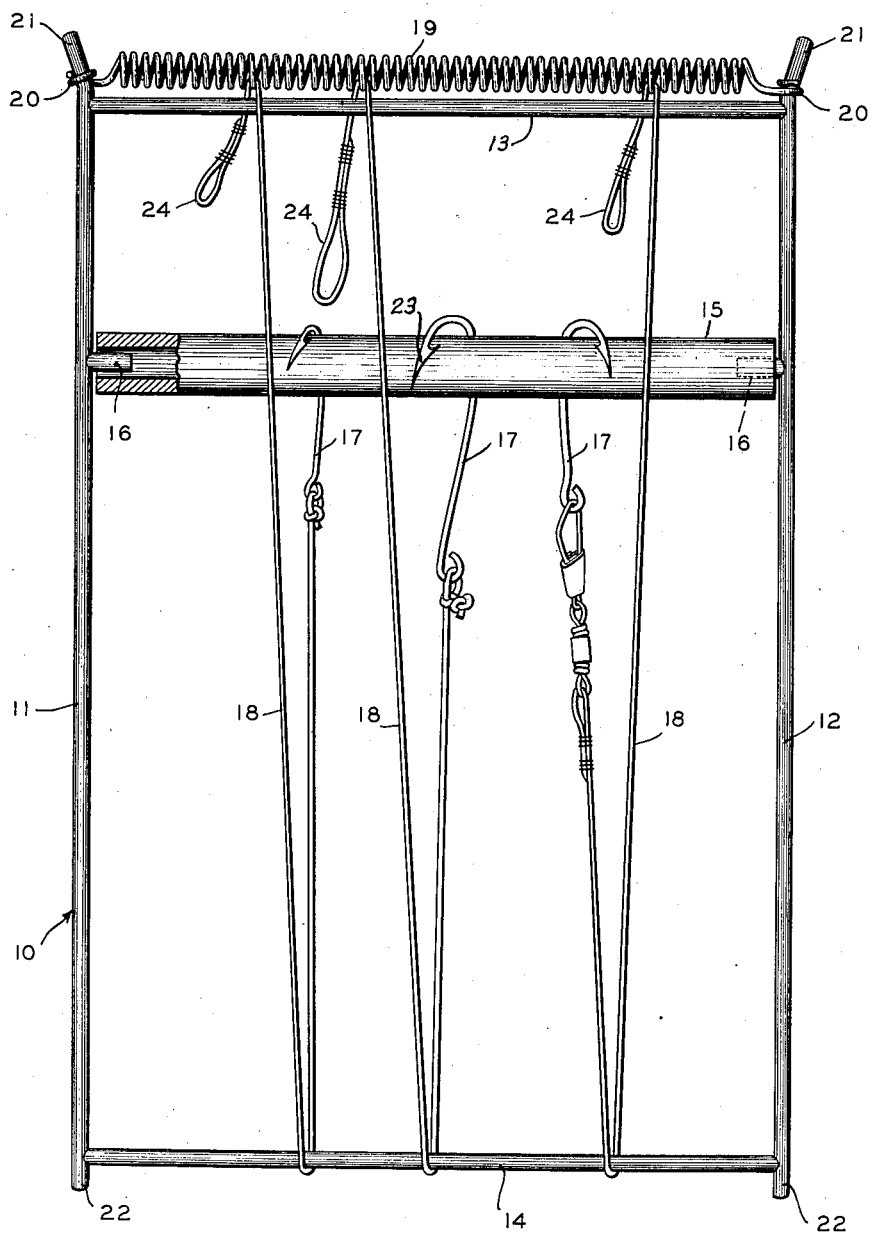

2,501,443

UNITED STATES PATENT OFFICE 2,501,443

STAGING RACK

Robert L. Fitzsimmons, Tucumcari, N. Mex.

Application March 18, 1948, Serial No. 15,566

4 Claims. (Cl. 43—57.5)

This invention relates to fishing and more particularly to a rack designed to facilitate transportation or storage of certain types of fishing tackle in order to prevent damage thereto and snarling and tangling of attached lines.

In certain types of fishing a relatively long line is employed which may extend between the banks of a stream or which may be suspended in any desired manner over the surface of the water. This is commonly termed a trot line and to this line there are attached a plurality of drop lines or stagings spaced at intervals therealong to the lower end of which are attached hooks of the proper size and type for the fish expected to be taken.

Since it is frequently desirable to increase or decrease the number of drop lines attached to a trot line and also since the drop lines are normally removed from the trot line at the end of a days fishing and reattached thereto before fishing is again commenced it has been found desirable to provide some means for quickly and easily storing and transporting the drop lines and hooks without danger of their becoming snarled or damaged, and it is also desirable that this device be of light weight and relatively inexpensive construction.

It is therefore an object of this invention to provide a staging rack of relatively simple and inexpensive construction providing means to permit the rapid application or removal of trot line hooks and the attached staging or drop lines in order to transport or store this tackle in condition for immediate and convenient use.

It is a further object of this invention to provide a staging rack of relatively small size which will accommodate trot line hooks having relatively long stagings or drop lines attached thereto and which also incorporates means for preventing damage to the point or barb of the hook.

Further objects and advantages of the invention will be apparent from the following specification taken in conjunction with the accompanying drawings, wherein the single figure is an elevation of one embodiment of the invention employing various types of hooks and with parts in section for greater clarity.

With continued reference to the drawing, there is shown a staging rack 10 comprising a generally rectangular frame of side bars 11 and 12, upper and lower cross bars 13 and 14 and an intermediate roller 15 journalled on pins 16 secured to side bars 11 and 12 and extending inwardly therefrom.

Bars 11, 12, 13 and 14 may be made of relatively light gauge metal and may be conveniently secured together as by welding or the like. Pins 16 may be made of the same metal as the side bars and are attached thereto by welding. Intermediate roller 15 may be made of wood or other soft or resilient non-metallic material in order to avoid damaging the points or barbs of the hooks which are applied thereto in a manner to be presently described.

Hooks 17 of various shapes and sizes may be applied over the roller 15 and the attached staging or drop line 18 passed downwardly and around the lower cross bar 14. From this point the line 18 is extended upwardly and is securely held in place by being forced between the convolutions of a coil spring 19 positioned above and adjacent the upper cross bar 13. In order to secure the spring 19 in position, each end thereof is provided with a loop 20 which is received over the upper ends 21 of side bars 11 and 12. Ends 21 may be bent outwardly as shown in order to prevent accidental displacement of loops 20 therefrom.

Also as shown in the drawing the lower ends 22 of side bars 11 and 12 extend slightly below cross bar 14 in order to retain lines 18 within the confines of the side bars 11 and 12 and prevent slipping of the lines 18 from the lower cross bars 14.

Roller 15 is mounted for rotary movement on pins 16 in order that hooks 17 may be easily engaged thereover and also to facilitate removal of the same, since when engaged over roller 15 the barbs 23 tend to become imbedded in the material of the roller and if this were not mounted for rotation, the barb 23 would tear itself from the material upon removal therefrom rather than merely causing the roller to rotate as in the present structure.

The lines 18 are conventionally provided with loops 24 at the ends opposite the hooks and these loops will merely run downwardly from the spring 19 without danger of becoming snarled or tangled, since the length from the spring to the end of loops will be relatively short.

In the use of this device the staging lines or drop lines are removed from the trot line. The hooks 17 are applied over the roller 15 and the attached staging or drop line 18 is passed downwardly and around the lower cross bar 14. The line is then extended upwardly and one portion drawn down between the convolutions of coil spring 19 which will hold the major portion of the line in taut condition and leave the free end with loop 24 hanging downwardly as shown in the figure. It is thus seen that this device is adapted to hold various lengths of line in taut condition and, if necessary for use on an extremely long line 18, it may be passed back down around the lower bar 14 a second time before securing the free end in spring 19.

This device may also be utilized to accommodate hooks having drop lines of shorter length than those shown, in which case hook 17 could be engaged over bar 14 the lines 18 then merely extending upwardly to be secured by the spring 19.

It will thus be seen that there has been provided by this invention a very simple, light weight, and inexpensive, yet highly efficient device for storing or transporting trot line hooks and the attached staging without the danger of loss or damage or of becoming snarled, which are available for immediate and convenient use and which may be reapplied to the rack in a minimum of time.

It will be understood that the word "staging" as used throughout this specification and in the following claims refers to one of a number of lines adapted to be provided with a hook and attached to a long trot line at various points to provide a series of positions or stations for catching fish in accordance with common terminology among fishermen.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A lightweight staging rack comprising side bars, upper and lower cross bars secured to said side bars adjacent and slightly spaced from the opposite ends thereof and forming a rectangular frame, opposed pins secured to said side bars extending inwardly therefrom and positioned intermediate said upper and lower cross bars, a roller of non-metallic material rotatably received on said pins, and a coil spring in tensioned condition positioned slightly above and adjacent said upper cross bar, the ends of said spring having means received over the upper projecting ends of said side bars, said upper projecting ends being bent outwardly at a slight angle whereby accidental displacement of the ends of said spring therefrom is prevented, said rack being adapted to receive trot line hooks over said roller and drop lines attached to said hooks passing downwardly and around said lower cross bar, upwardly and through the convolutions of said spring whereby said hooks and lines are retained on said rack in tensioned condition to avoid damage or snarling thereof, the non-metallic material of said roller preventing damage of the points or barbs of said hooks.

2. A light weight staging rack comprising side bars, upper and lower cross bars secured to said side bars adjacent and slightly spaced from the opposite ends thereof and forming a rectangular frame, a roller of non-metallic material rotatably mounted on said side bars intermediate said upper and lower cross bars, and a coil spring in tensioned condition positioned slightly above and adjacent said upper cross bar, the ends of said spring having means received over the upper projecting ends of said side bars, said upper projecting ends being bent outwardly at a slight angle whereby accidental displacement of the ends of said spring therefrom is prevented, said rack being adapted to receive trot line hooks over said roller and drop lines attached to said hooks passing downwardly and around said lower cross bar, upwardly and through the convolutions of said spring whereby said hooks and lines are retained on said rack in tensioned condition to avoid damage or snarling thereof, the non-metallic material of said roller preventing damage to the points or barbs of said hooks.

3. A light weight staging rack comprising side bars, upper and lower cross bars secured to said side bars adjacent and slightly spaced from the opposite ends thereof and forming a rectangular frame, opposed pins secured to said side bars extending inwardly therefrom and positioned intermediate of said upper and lower cross bars, a roller of non-metallic material rotatably received on said pins, a coil spring positioned slightly above and adjacent said upper cross bar, the ends of said spring having means received over the upper projecting ends of said side bars, and means for preventing accidental displacement of the ends of said spring from the ends of said side bars, said rack being adapted to receive trot line hooks over said roller and drop lines attached to said hooks passing downwardly and around said lower cross bar, upwardly and through the convolutions of said spring whereby said hooks and lines are retained on said rack in tensioned condition to avoid damage or snarling thereof, the non-metallic material of said roller preventing damage to the points or barbs of said hooks.

4. A light weight staging rack comprising side bars, upper and lower cross bars secured to said side bars adjacent and slightly spaced from the opposite ends thereof and forming a rectangular frame, a roller of non-metallic material rotatably mounted on said side bars intermediate said upper and lower cross bars, a coil spring positioned slightly above and adjacent said upper cross bar, and means on said frame and said spring for retaining said spring in position against accidental displacement, said rack being adapted to receive trot line hooks over said roller and drop lines attached to said hooks passing downwardly and around said lower cross bar upwardly and through the convolutions of said spring whereby said hooks and lines are retained on said rack in tensioned condition to avoid damage or snarling thereof, the non-metallic material of said roller preventing damage to the points or barbs of said hooks.

ROBERT L. FITZSIMMONS.

REFERENCES CITED

The following references are of record in the file of this patent:

UNITED STATES PATENTS

| Number | Name | Date |
|---|---|---|
| 1,011,081 | Reely | Dec. 5, 1911 |
| 1,676,119 | Tipil | July 3, 1928 |
| 1,957,352 | Patricoski | May 1, 1934 |